J. G. HEASLET.
REAR AXLE AND TRANSMISSION CONSTRUCTION.
APPLICATION FILED JAN. 22, 1916.
1,212,635.
Patented Jan. 16, 1917.
3 SHEETS—SHEET 1.
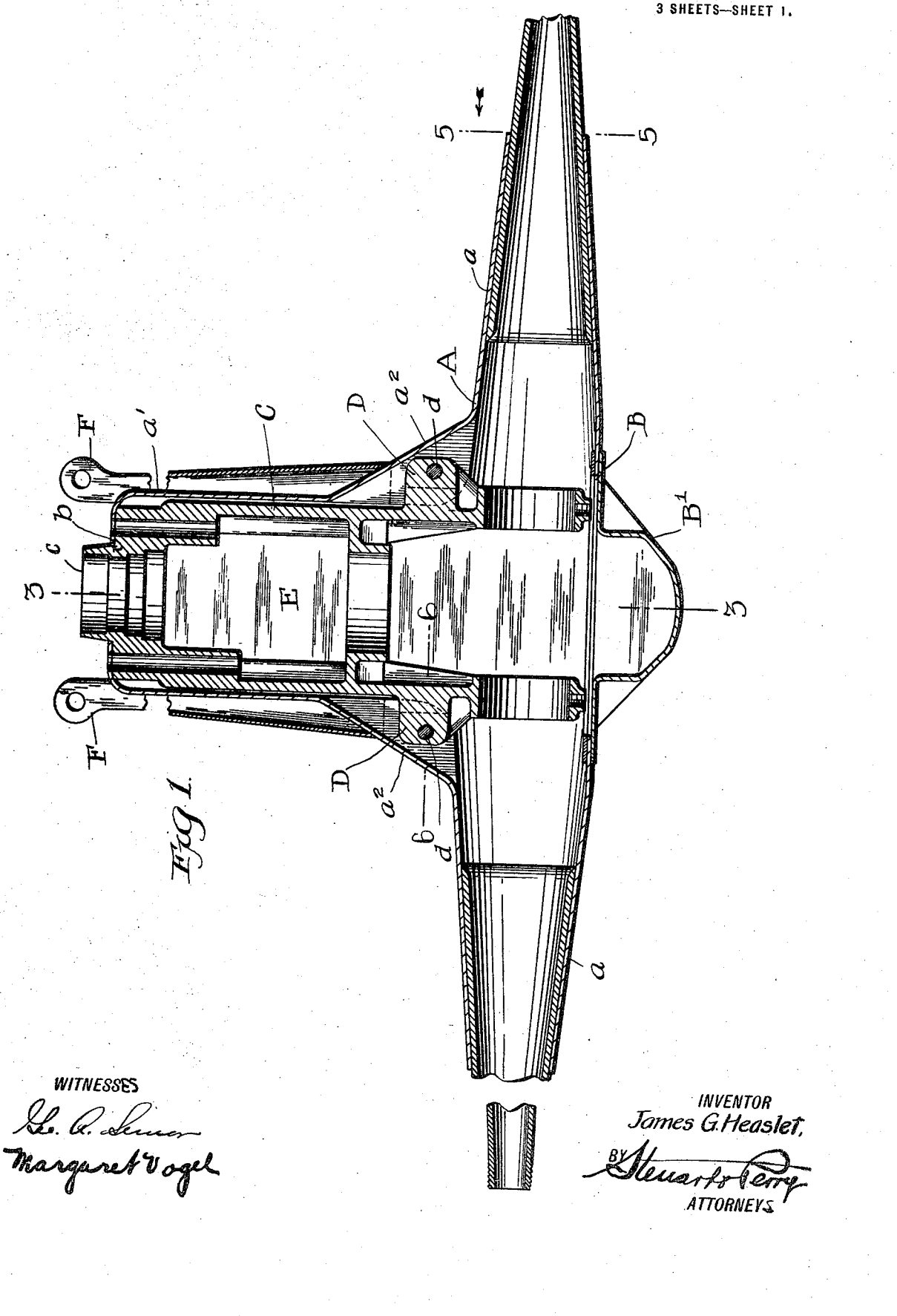
WITNESSES
INVENTOR
James G. Heaslet,
BY
ATTORNEYS J. G. HEASLET.
REAR AXLE AND TRANSMISSION CONSTRUCTION.
APPLICATION FILED JAN. 22, 1916.
1,212,635.
Patented Jan. 16, 1917.
3 SHEETS—SHEET 2.
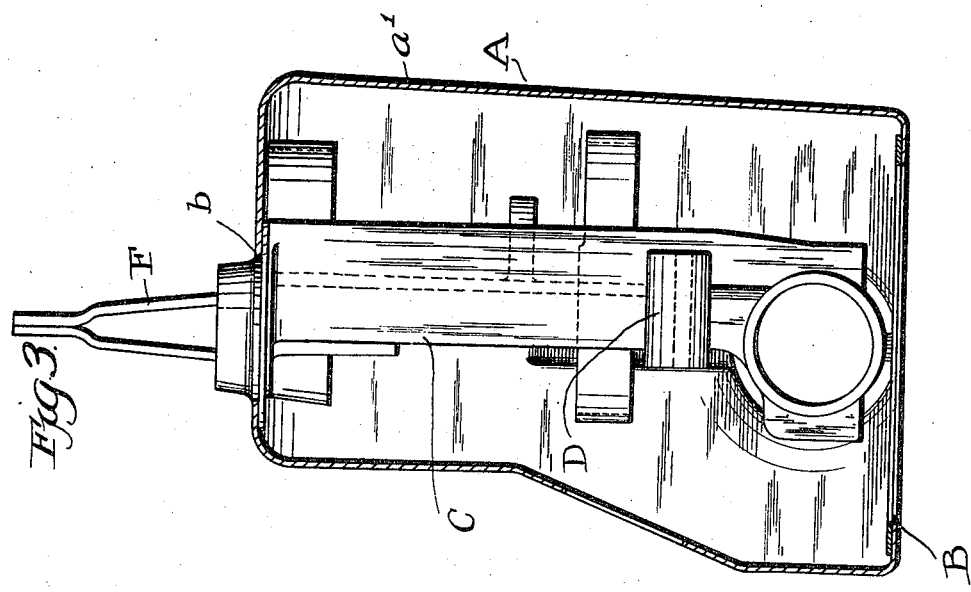
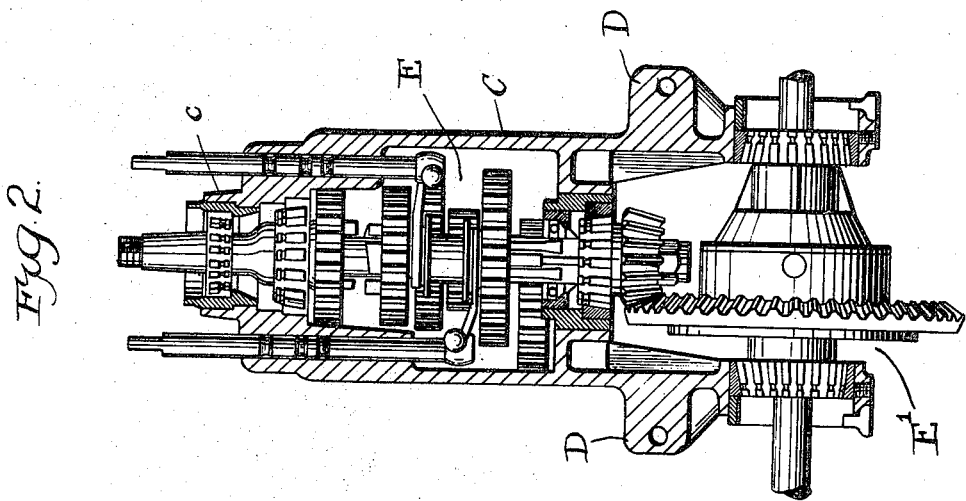
WITNESSES
Gu. A. Senin
Margaret Vogel
INVENTOR
James G. Heaslet,
BY Stewart Perry
ATTORNEYS

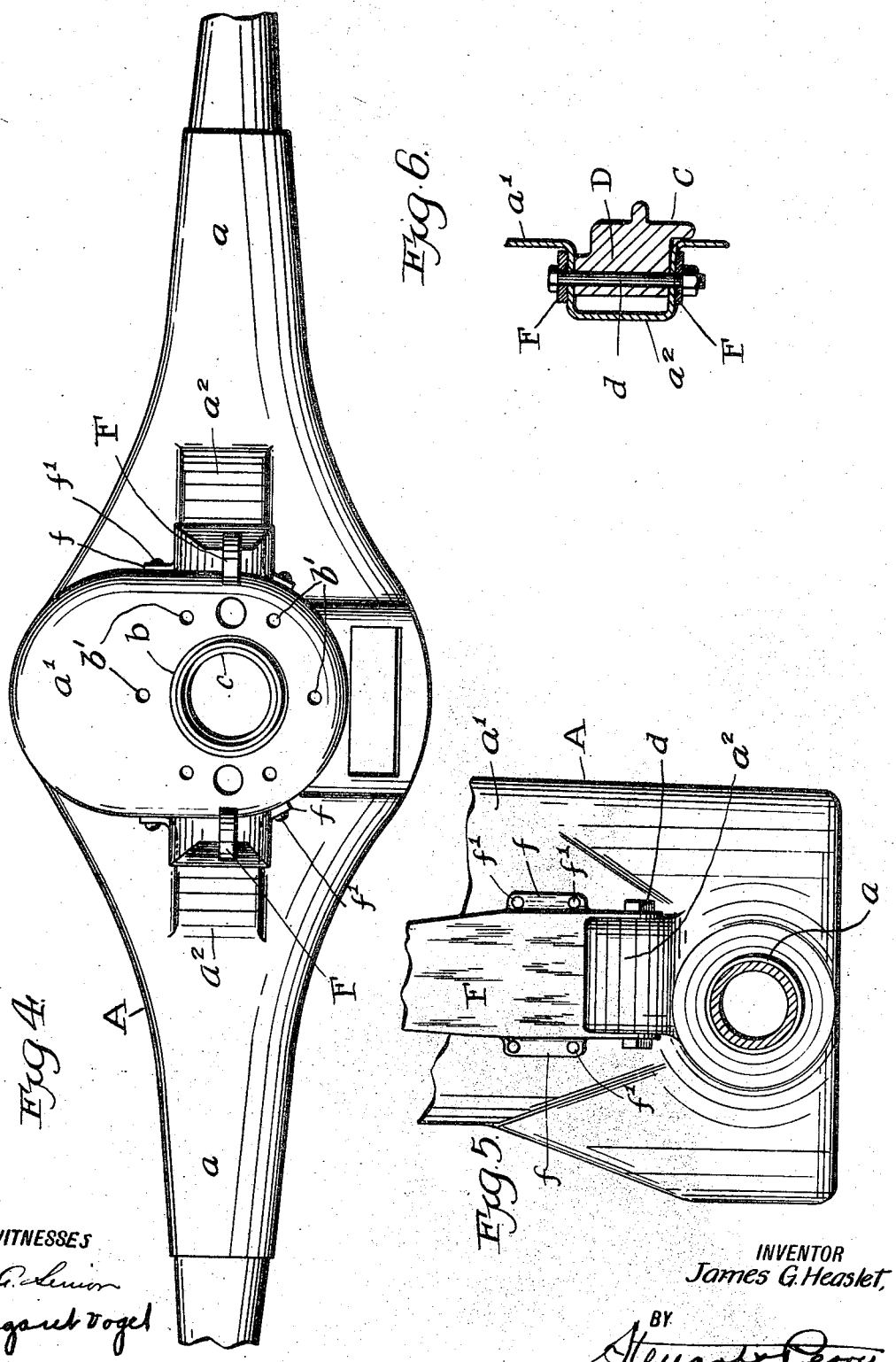

UNITED STATES PATENT OFFICE.

JAMES G. HEASLET, OF DETROIT, MICHIGAN, ASSIGNOR TO THE STUDEBAKER CORPORATION, A CORPORATION OF NEW JERSEY.

REAR-AXLE AND TRANSMISSION CONSTRUCTION.

1,212,635.

Specification of Letters Patent. Patented Jan. 16, 1917.

Application filed January 22, 1916. Serial No. 73,543.

*To all whom it may concern:*

Be it known that I, JAMES G. HEASLET, a citizen of the United States of America, and resident of Detroit, in the county of Wayne and State of Michigan, have invented certain new and useful Improvements in Rear-Axle and Transmission Construction, of which the following is a specification.

This invention is a rear axle and transmission construction, and among the objects of the invention may be mentioned the simplification of such constructions, minimizing the machining required in mounting the operating parts, facilitating the assembling and dismantling of the components of the structure, increasing the superiority of such structures generally, and materially reducing the cost of manufacturing such structures.

With the foregoing objects in view, the invention, speaking generally, embodies a frame or carrier member for receiving and supporting the transmission mechanism, including the differential, which frame and mechanism are so associated that they may be handled as a unit, and a coöperating casing into which said unit may be readily inserted or removed, without dismantling any parts of said unit. In the preferred embodiment of the invention, said casing is so formed or constructed as to serve the dual purpose of housing the unit as specified, and forming the rear axle of a vehicle.

In making prior art structures of the general character under consideration, it is customary to build up the structure from a large number of parts which are bolted or riveted together to form the rear axle and a housing for the associated mechanisms. The machining of these various parts is comparatively laborious and costly, and, as said parts, in the main, are cumbersome, the weight of the structure is very considerable. To obviate this disadvantage in weight, it has been the practice, particularly in light or medium weight motor cars, to construct the parts from aluminum, or other light and expensive metals. Moreover, in the structures referred to, when any part of the operating mechanism gets out of order, or when it is necessary to replace any part or parts thereof for repair or otherwise, it is necessary to dismantle practically the whole rear of the automobile chassis; in other words, to dismantle the rear axle and practically all of its associated housings, supports, and actuating mechanisms. The present invention, for the reasons given, overcomes the foregoing disadvantages, and others, and constitutes an important advance in automobile construction.

Features of the invention, other than those specified, will be apparent from the hereinafter detailed description taken in conjunction with the accompanying drawings.

In the accompanying drawings, I have illustrated one practical embodiment of the invention, but the construction shown therein is to be understood as illustrative, only, and not as defining the limits of the invention.

Figure 1 is a substantially horizontal, central section through a rear axle and transmission construction embodying the present invention, the wheel-operating mechanism being omitted in the interest of clearness. Fig. 2 is a similar section through a carrier member, showing the wheel-operating parts in elevation. Fig. 3 is a transverse section on line 3—3 of Fig. 1, showing, in section, a casing member which I prefer to employ, and the carrier member or frame in elevation. Fig. 4 is a front elevation of the parts shown in Fig. 1. Fig. 5 is a section on line 5—5 of Fig. 1, and Fig. 6 is a section taken on line 6—6 of Fig. 1.

Referring to the drawings, A indicates a sheet metal housing which is preferably pressed up in two parts in the form shown in Fig. 1, and then electrically, or otherwise, welded together to form a rear axle $a$, and transmission housing $a'$. At its forward end, transmission housing $a'$ is provided with an aperture $b$, and at its rear end is formed a larger aperture B, the latter aperture being normally closed by a suitable cover-plate B'. Aperture B is made of sufficient size to allow of the passage therethrough of a frame or carrier member C, herein shown as in the form of a single casting. At the forward portion of frame C is a boss $c$, which extends forwardly beyond the end of the frame, and on the sides, and intermediate the ends of said frame, are formed a pair of laterally projecting lugs D, which are positioned on the opposite sides of the frame.

Transmission housing $a'$ and frame or carrier member C are so organized and proportioned that said frame may be passed from a position exterior of the housing, through aperture B therein, and into a position interior of the housing, upon which operation boss $c$ will pass through aperture $b$ in the housing and snugly fit into said aperture, for the purpose of centralizing frame C within the housing. To facilitate this operation, boss $c$ is preferably tapered, as shown more particularly in Fig. 1. Moreover, the transmission housing $a'$ is formed with oppositely positioned pockets $a^2$, shaped to conform to the lugs D, and said lugs enter these pockets when the frame is inserted into, and seated within, the housing, as described. The lugs D and the sides of the pockets $a^2$ are provided with alined apertures whereby bolts $d$ may be passed therethrough for the purpose of rigidly locking the frame to the housing. Additional locking or securing means is provided in the form of a plurality of bolts or lag screws which are inserted through apertures $b'$ in the forward end of the housing and engage with the forward end of frame C. The securing means described serves to rigidly lock the parts together in such manner that they will not be apt to work loose or rattle.

In the preferred embodiment of the invention, the transmission mechanism and differential, E and E', respectively, are mounted, in their entirety, interior of the frame or carrier member C, as shown in Fig. 2, and, in the initial installation of these mechanisms, they are assembled within the carrier member prior to attaching it to the housing. After all of the parts of said mechanisms are in place and in proper adjustment within carrier member C, the same is transported, as a unit, to a position interior of housing $a'$, as shown in Fig. 1, and secured in place as hereinbefore described. When the carrier member is mounted in the housing, the axle shafts and drive shaft are coupled up in the usual manner, and the torque or torsional rods F, which are generally associated with rear axle constructions, may be secured to the chassis in any suitable way. The axle construction of this invention is such that the torsional rods F may be easily and rigidly secured thereto. These torsional rods are preferably channeled near their rear ends, and are provided with yokes which straddle the pockets $a^2$ of housing $a'$. The yoked portions of rods F are provided with alined apertures so that the bolts $d$, which secure carrier member C within its housing, are adapted to simultaneously pass through the apertures referred to in the rods and secure them in place. This results in a rigid and strong construction, which rigidity is enhanced by providing flanges $f$ on the rods at their channeled portions, and riveting these flanges to housing $a'$ by rivets $f'$, as clearly appears in Figs. 4 and 5.

By constructing the rear axle and its associated parts as described, the resulting structure, in its entirety, is compact, strong, and of pleasing appearance. Moreover, it is dust-proof, thereby fully protecting the operating parts of the mechanism from dust and grit. Furthermore, the construction is such as to allow of very efficient lubrication, since a heavy oil may be inclosed within carrier member C to partially submerge the operating gears and insure their thorough lubrication.

Another important feature of the invention resides in the fact that the minimum number of parts composing the supporting structure for the differential and transmission mechanisms greatly reduces the tendency of "working" between the parts, and there is, therefore, less liability of the joints loosening, with the consequent disadvantage, incident in prior art structures, of leakage of the lubricating oil.

The most important feature of the invention, however, is that the transmission mechanism and differential may be assembled, in their entirety, in a position outside of the chassis of a motor car and thereafter picked up as a unit and placed in position, or removed from a motor car chassis as a unit, as the case may be. This is, manifestly, a pronounced advance in automobile construction, since, in prior art structures, it is usually necessary to assemble portions of the mechanism separately on the chassis, and, in like manner, dismantle the parts separately. This method of operation is laborious and difficult, even when the chassis is stripped, and these disadvantages are, of course, much greater when a vehicle body is mounted thereon. When such is the case, it is not infrequent that it is necessary to dismantle the entire rear portion of the chassis, including the running gear, etc., to get access to some gear which may have been stripped or otherwise rendered inoperative. From the foregoing comparison between the present invention and prior art structures, the great commercial importance of the former will be apparent.

The carrier member which supports all the mechanism embodies practically the entire surfaces which it is necessary to machine, and, accordingly, when the small casting C has been machined, substantially all of the machining relative to the working parts of the transmission mechanism and differential is completed. It is apparent, therefore, that the present invention greatly reduces the number of surfaces to be machined, and concentrates the parts on which machining is necessary. Practically all the work can be done on the carrier in a single machine, thereby greatly economizing cost over methods heretofore employed in constructing the supporting and incasing devices for the transmission and differential.

In the preferred embodiment of the invention, casing or housing A is so formed as to constitute both a rear axle construction and a transmission housing. The invention, however, is not restricted to a structure embodying the combined housings as specified. The invention, in so far as concerns the removability of the transmission mechanism and differential as a unit, or their replacement in the chassis as a unit, is, of course, applicable to various forms of rear axles.

I desire to have it understood that parts of the invention may be employed, and some of the advantages of the invention thus secured, without using the invention as an entirety, and, accordingly, I desire to cover the invention as broadly as is commensurate with the appended claims.

Having thus fully described the invention, what I claim as new, and desire to secure by Letters Patent, is:

1. In a structure of the class described, the combination of a hollow rear axle provided with a forwardly extending casing and having, at its back, an opening in alinement with the forwardly extending casing, a carrier member within said axle and casing, and removable therefrom through the opening in the former, motor car transmission mechanism mounted on and carried by the carrier member, and differential mechanisms also mounted on and carried by said carrier member, whereby the carrier member with the associated transmission and differential may be inserted into or removed from the axle and casing as a unit.

2. In a structure of the class described, the combination of a hollow rear axle provided with a forwardly extending casing and having, at its back, an opening in alinement with the forwardly extending casing, a carrier member within said axle and casing, and removable therefrom through the opening in the former, motor car transmission mechanism mounted on and carried by the carrier member, and differential mechanisms also mounted on and carried by said carrier member, whereby the carrier member with the associated transmission and differential may be inserted into or removed from the axle and casing as a unit, and means for rigidly securing the carrier in position and simultaneously attaching the torque rods of the vehicle to the carrier member.

3. In a structure of the class described, the combination of a hollow rear axle provided with a forwardly extending casing and having, at its back, an opening in alinement with the forwardly extending casing, a carrier member within said axle and casing, and removable therefrom through the opening in the former, motor car transmission mechanism mounted on and carried by the carrier member, and differential mechanisms also mounted on and carried by said carrier member, whereby the carrier member with the associated transmission and differential may be inserted into or removed from the axle and casing as a unit, pockets in the interior of the casing, and projections on the carrier member adapted to seat in said pockets to properly position the carrier member within the casing.

4. In a structure of the class described, the combination of a hollow rear axle provided with a forwardly extending casing and having, at its back, an opening in alinement with the forwardly extending casing, a carrier member within said axle and casing, and removable therefrom through the opening in the former, motor car transmission mechanism mounted on and carried by the carrier member, and differential mechanisms also mounted on and carried by said carrier member, whereby the carrier member with the associated transmission and differential may be inserted into or removed from the axle and casing as a unit, pockets in the interior of the casing, projections on the carrier member adapted to seat in said pockets to properly position the carrier member within the casing, and bolts passed through the pockets and projections to secure the carrier member in position.

5. In a structure of the class described, the combination of a hollow rear axle provided with a forwardly extending casing and having, at its back, an opening in alinement with the forwardly extending casing, a carrier member within said axle and casing, and removable therefrom through the opening in the former, motor car transmission mechanism mounted on and carried by the carrier member, and differential mechanisms also mounted on and carried by said carrier member, whereby the carrier member with the associated transmission and differential may be inserted into or removed from the axle and casing as a unit, pockets in the interior of the casing, projections on the carrier member adapted to seat in said pockets to properly position the carrier member within the casing, and bolts passed through the pockets and projections to secure the carrier member in position, said bolts also serving to attach the torque rods of the vehicle to the carrier member.

6. In an automobile chassis, a casing embodying a rear axle and a transmission housing, and a carrier member removably positioned within said casing, said carrier member being adapted to support both the transmission and differential mechanisms, whereby the carrier member, transmission and differential mechanisms may be inserted or removed, as a unit, from said casing.

7. In a structure of the class described, a carrier member adapted to support and carry both the entire transmission and differential mechanisms, whereby the carrier member, transmission mechanism and differential may be handled as a unit.

8. In a structure of the class described, a carrier member adapted to support and carry both the entire transmission and differential mechanisms, whereby the carrier member, transmission mechanism and differential may be handled as a unit, and a casing in which said carrier and its associated mechanisms are secured.

9. In an automobile chassis, a casing embodying a rear axle and a transmission housing, a carrier member removably positioned within said casing, said carrier member being adapted to support both the entire transmission and differential mechanisms, whereby the carrier member, transmission mechanism and differential may be inserted or removed, as a unit, from said casing, and means for securing the carrier member within said casing.

10. As a new article of manufacture, an integral sheet metal casing adapted to serve as the rear axle of a motor vehicle and to incase the entire transmission and differential mechanisms of said vehicle, and a common carrier insertible into and removable from the casing and on which both the transmission and differential mechanisms are mounted, whereby the carrier, transmission mechanism, and differential mechanism, may be handled as a unit in their insertion into or removal from, the casing.

Signed by me at Detroit, Michigan, this 31st day of December, 1915.

JAMES G. HEASLET.

Witnesses:
R. E. SCRATCH,
ROY C. GAMBLE.